United States Patent [19]

Ratcliffe

[11] Patent Number: 4,708,322

[45] Date of Patent: Nov. 24, 1987

[54] ELECTRIFIED FENCE GATE

[76] Inventor: Marvin E. Ratcliffe, Rte. 2, Box 206, Princeton, W. Va. 24740

[21] Appl. No.: 938,952

[22] Filed: Dec. 8, 1986

[51] Int. Cl.⁴ .............................................. A01K 3/00
[52] U.S. Cl. ...................................... 256/10; 256/23; 49/59
[58] Field of Search ................ 256/23, 10; 49/59, 10; 160/332

[56] References Cited

U.S. PATENT DOCUMENTS

| | | | |
|---|---|---|---|
| 2,476,233 | 7/1949 | Wood | 256/10 |
| 3,293,800 | 12/1966 | Martinmaas | 49/59 |
| 3,614,844 | 10/1971 | Withers | 256/10 X |
| 4,006,714 | 2/1977 | Goossen | 256/10 X |
| 4,384,606 | 5/1983 | Johnston et al. | 160/332 |
| 4,493,480 | 1/1985 | Nichol | 256/10 |

Primary Examiner—Andrew V. Kundrat
Attorney, Agent, or Firm—Larson & Taylor

[57] ABSTRACT

An electrified fence gate using a series of flexible electrically conductive gate wires extending generally vertically from a rigid support and being connected to flexible spacing means.

8 Claims, 3 Drawing Figures

ELECTRIFIED FENCE GATE

BACKGROUND OF THE INVENTION

I. Field of the Invention

This invention relates to improvements in electrified fence gates and, more particularly, to a gate which will permit the free passage of automobiles and the like but will prevent the passage of livestock animals through the gate opening by use of an electric shock.

II. Description of Prior Art

It is known in the art to provide and electrified fence gate having a series of spaced gate wires depending from a horizontal support means extending across the opening of the gate. For example, U.S. Pat. No. 4,493,480 to Nichol, describes and electrified fence gate with flexible support wire 24 an multiple gate wires 26. Furthermore, U.S. Pat. No. 2,476,233 to Wood, discloses an electric guard for livestock using free hanging electrified wires 15 hanging from a common horizontal wire 10. In addition, U.S. Pat. No. 4,006,714 to Goossen, shows an animal gate using a plurality of flexible electrical conductors hanging down from spaced points on a crossarm.

All of the above prior art devices involve the use of a plurality of hanging wires or other elements to form the gate. However, this construction leads to certain disadvantages which are caused by the tendency of the vertical wires or flexible elements to become entangled with another because of passage of a vehicle or due to other causes such as wind or breezes which would be present in the environment wherein the prior art gates are used. Moreover, the devices of the Wood and Nichol patents rely upon a single horizontal wire to support the vertically oriented gate wires and, consequently, the snagging of one or more of the gate wires by a vehicle could lead to the breakage of the horizontal support wire.

The present invention is intended to overcome the above disadvantages by providing means to avoid the entanglement of the gate wires and by providing robust mounting means for the gate wires so that the gate wire support will not be damaged.

BRIEF SUMMARY OF THE INVENTION

According to one aspect of the present invention I provide improvements to an electrifiable fence gate which has a flexible electrically conductive support wire extending generally horizontally and spanning the gate opening in a fence above ground level. The conductive support wire is secured at its ends to the elements (e.g. posts) of the fence at each end of the gate opening. A series of flexible, electrically conductive gate wires extend generally vertically and each is connected at its upper end to the support wire. According to the present invention, I provide a rigid support means which extends generally horizontally adjacent to the conductive support wire and which is secured and supported at its ends by the elements of the fence. Furthermore, I provide a series of flexible spacing means of non-conductive material, such as sheets of vinyl material, each extending generally vertically and connected at its upper end to the rigid support means. Each of the gate wires is attached to a respective sheet of vinyl material at various positions along the length of the gate wire.

In accordance with further aspects of the present invention, I provide a length of pipe to form the rigid support means extending between the elements of the fence forming the gate opening. In using said length of pipe, the sheets of vinyl material can be suitably connected to the pipe by means of loops formed in the upper end of the vinyl sheet.

According to still a further aspect of the present invention the flexible gate wires are attached to the edges of the sheets of vinyl by being threaded through holes formed in and spaced along the vertical edges of the vinyl sheets. According to another aspect of the present invention, I provide a series of short lengths of non-conductive pipe telescopically mounted in the rigid support pipe to act as spacer means for the upper ends of the sheets of vinyl material.

One object of the present invention is to provide an electrifiable gate having a construction which reduces the tendency of the vertical gate wires of the prior art devices to become fouled or entangled with portions of a vehicle passing through the gate or with themselves due to causes such as wind.

Still another object of the present invention is to provide an improved construction for an electrifiable fence gate wherein the vertical gate wires are supported by robust rigid support means extending generally horizontally adjacent to a conductive support wire exemplified by the prior art.

The above and other objects and features of the present invention will be apparent from a reading of the following description of the disclosure found in the accompanying drawings and the appended claims.

BRIEF DESCRIPTION OF THE DRAWINGS

The drawings illustrate a prefered embodiment of the present invention and they are briefly as follows.

DETAILED DESCRIPTION OF THE PREFERRED EMBODIMENT

Figure 1:
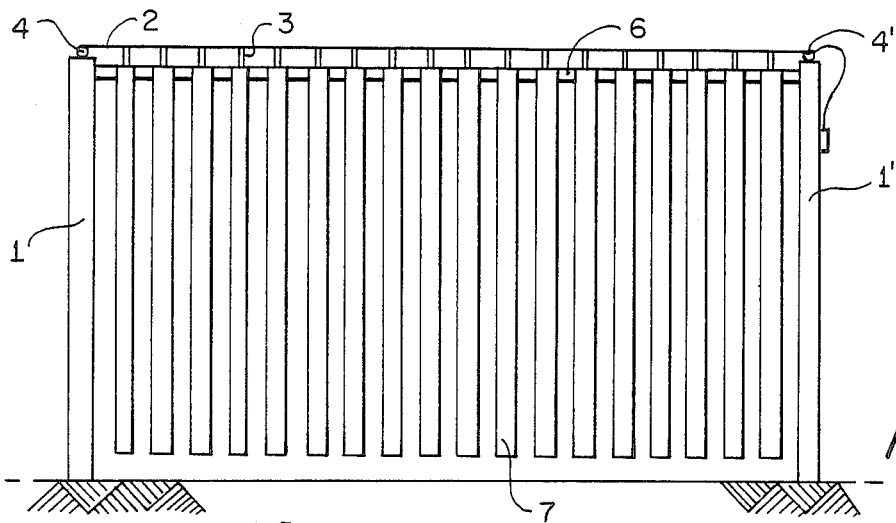
FIG. 1 is a front elevational view of the electrified fence gate according to one embodiment of the present invention.
Figure 2:
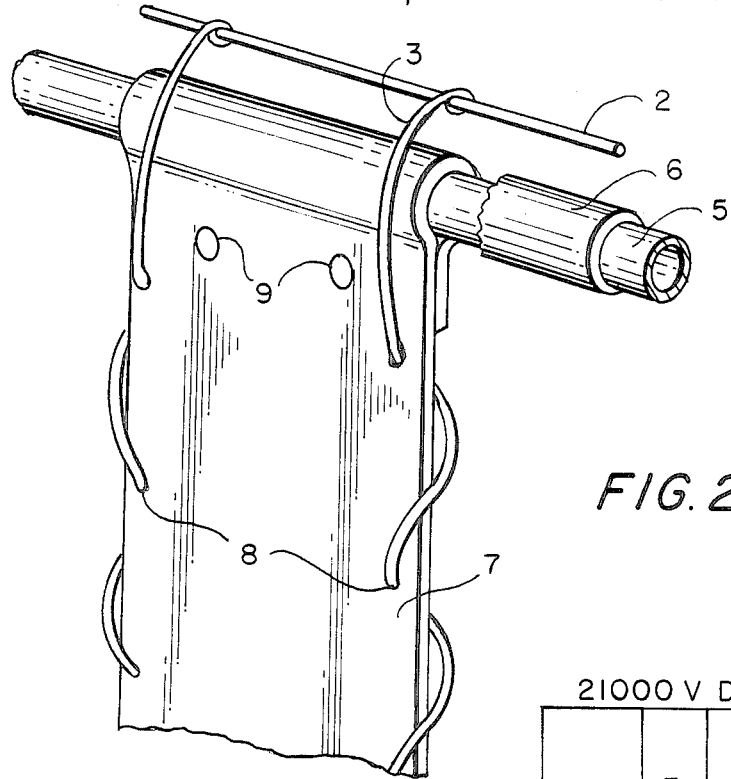
FIG. 2 is an enlarged fragmentary view detailing the connection of two of the vertical gate wires to the horizontal support wire, the rigid support means and the flexible spacing sheet.

In the drawing, like referece numerals apply to similar parts throughout the several views. The preferred embodiment shown in FIG. 1 involves support posts 1 and 1' which extend upwardly from the ground to define the gate opening therebetween. As generally shown in FIG. 1, a bare copper wire 2 provides a flexible, electrically conductive support wire extending generally horizontally and spanning the gate opening at a selected distance above ground level. The bare copper wire 2 is secured at its ends to the support posts 1 and 1' on insulators 4 and 4', respectively. A series of flexible, electrically conductive bare copper gate wires 3 extend generally vertically and each is connected at its upper end to the bare copper wire 2 as shown in more detail in FIG. 2. In the preferred embodiment, the bare copper wire 2 is 12 gage and the bare copper wires 3 are 20 gage. In FIG. 1 a rigid support means formed by a 2 inch diameter galvanized pipe 5 extends generally horizontally adjacent to the conductive support wire 2 with the ends of the pipe 5 being secured to the posts 1 and 1'. A series of elongated non-conductive sheets 7 of vinyl are used as spacing means which extend generally vertically, each vinyl sheet being connected as its upper end to the rigid support pipe 5. The details of the connection are shown in FIG. 2 and described below. Furthermore, as shown in FIG. 2, the gate wires 3 are attached to the edges of the vinyl sheets 7 at least at various positions along the length of the gate wires 3.

Referring to FIG. 2, the specific construction of the preferred embodiment is illustrated. As seen in FIG. 2, the electrically conductive support wire 2 is oriented just above the galvanized pipe 5 which provides a rigid support across the gate opening as seen in FIG. 1. Each of the gate wires 3 is attached by a loop at its upper end to the support wire 2. The remaining portion of each gate wire extending below support wire 2 is attached to the edges of the vinyl sheet 7 by being threaded through holes 8 formed in and spaced along the vertical edges of the vinyl sheet as seen in FIG. 2. As best seen in FIG. 1, the gate wires and the vinyl sheets extend to a position somewhat above the level of the ground in the gate opening. In the preferred embodiment illustrated in FIG. 2, the upper ends of the vinyl sheets are attached to the pipe 5 by a loop formed by the upper end of the vinyl sheet being wrapped around the pipe and secured together by fastening means 9. As best seen in FIG. 2, even though the gate wires 3 are threaded through holes 8 along the edges of the vinyl sheet 7, portions of the gate wire 3 between the holes in the vinyl sheet are outwardly facing and are available to contact and shock an animal that attempts to pass through the gate when electrified.

As seen in FIG. 1, the sheets 7 are horizontally spaced from one another and this is accomplished in the preferred embodiment by using a series of spacer pipe sections 6 which are telescopically received on the pipe support 5 and are interposed between the edges of each of the upper ends of sheets 7. The spacer 6 is preferably formed by a non-conducting material such as a section of PVC pipe of suitable diameter.

Several of the advantages of the present invention are illustrated by the construction of FIG. 2. Thus, in contrast to the above described prior art, substantial portions of the gate wires 3 are supported by robust means including the vinyl sheets 7 and the rigid galvanized pipe 5. In contrast, the prior art gates rely upon a direct support between the gate wires such as gate wires 3 and the horizontally support wire 2. Thus, it should be readily apparent that the present constructon is such that it is much less likely that a snag of any of one or more of gate wires 3 will place such a force on support wire 2 that it will be broken thus deenergizing the entire electrified gate. Furthermore, as can be seen by the construction in FIG. 2, each of the gate wires 3 is supported along the edges of the vinyl sheets and this decreases the likelihood that the gate wires 3 will become entangled with one another or with some other object passing through the gate. This follows from the fact that the gate wires are no longer freely moveable with respect to one another and, according to the present construction, only supported gate wires 3 are relatively moveable with respect to one another on their respective vinyl sheets. In the preferred embodiment, the vinyl sheets are made of a clear material so that vision through the gate is not obstructed yet the robustness of the present construction is still maintained in comparison to the prior art devices described above.

Figure 3:
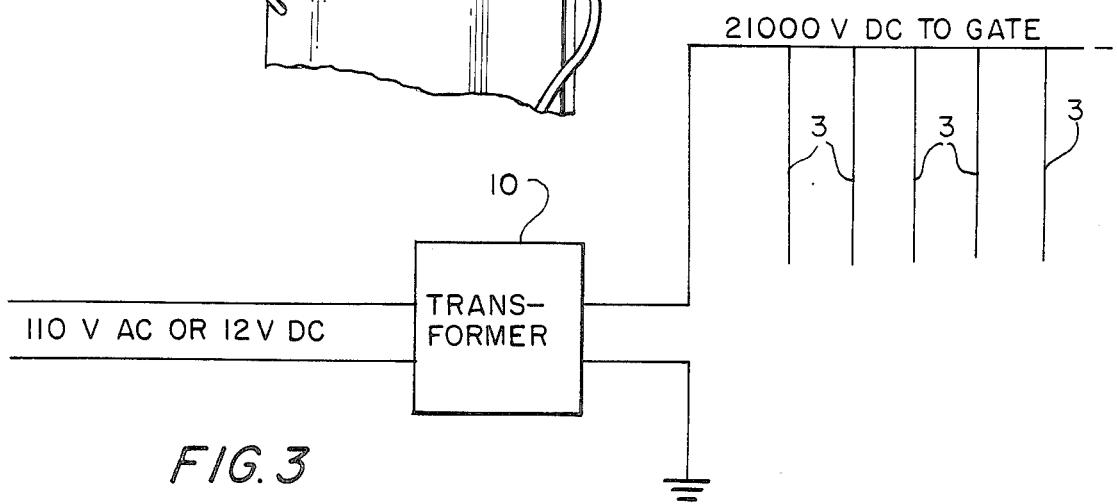
FIG. 3 is a schematic diagram of the electrical circuit for the gate of the preferred embodiment.

FIG. 3 is a schematic illustrating the electrical circuit for the gate according to the present invention. Thus, a transformer 10 of suitable design is connected to receive a suitable source of power which may be either 110 volts AC or 12 volts DC. The output of the transformer is attached to ground as illustrated and also is attached to the electrically conductive support wire 2 which extends across the gate opening on the insulators 4 and 4'. Of course, because of the electrical connection between gate wires 3 and wire 2, the gate wires also form an electrical path with the electrically conductive support wire 2 as shown in FIG. 3 in schematic form. In accordance with the preferred embodiment, the transformer 10 is selected so that 21,000 volts DC are provided to the gate wires 2 and 3. Obviously, if a farm animal comes into contact with any portion of the gate wires 3 which are bare conductive copper wires, the animal cause the wire to be grounded and a shock to be administered to the animal. In contrast, when a vehicle is driven through the gate wires, there is no grounding since the tires of the vehicle do not create a conductive path for discharge to ground.

In accordance with the preferred embodiment, I utilize vinyl sheets 7 which are $\frac{1}{8}$ inch thick and 8 inches wide and which are clear as indicated above. Furthermore, the holes 8 are spaced $\frac{1}{2}$ inch in from the edge of the sheet 7 and are spaced apart $1\frac{1}{2}$ inches in the vertical direction. Thus, the gate as shown in FIG. 1 is a series of 8 inch wide clear vinyl sheets with electrically conductive wires 3 attached to the edges of the sheets. In the preferred embodiment, the spacers located on each side of the vinyl sheet comprise PVC pipe sections 4 inches long and $2\frac{1}{2}$ inches in diameter. Thus, the vinyl sheets are spaced 4 inches apart according to the preferred embodiment.

While FIG. 1 shows a general installation, it is obvious that the heigth and width of the gate according to the present invention can be varied to suit the users' needs merely by using shorter or longer vinyl sheets and bare copper gate wires in addition to shorter or longer lengths of support pipe 5.

While I have shown and described certain preferred embodiments of my invention, it will be readily apparent to those skilled in the art that many changes of structure and operation can be made without departing from the spirit of the invention as defined in the appended claims.

I claim:

1. In an electrifiable fence gate having a flexible electrically conductive support wire extending generally horizontally and spanning a gate opening of a fence above ground level, said support wire being secured at its ends to elements of said fence, and a series of flexible electrically conductive gate wires extending generally vertically each connected at its upper end to said support wire, the improvement comprising:

a rigid support means extending generally horizontally adjacent to said conductive support wire, said rigid support means being secured at its ends to elements of said fence;

a series of flexible spacing means of non-conductive material extending generally vertically, each said spacing means being connected at its upper end to said rigid support means, each of said gate wires being attached to a respective spacing means at least at various positions along the length of said gate wire.

2. The invention of claim 1, wherein said rigid support means is a length of pipe.

3. The invention of claim 2, wherein each of said flexible spacing means is a sheet of vinyl material.

4. The invention of claim 3 wherein each of said sheets of vinyl material is clear and is mounted to said length of pipe by a loop formed by the upper end of said sheet.

5. The invention of claim 3, wherein said gate wires are attached to the edges of said sheets by being threaded through holes formed in and spaced along the vertical edges of said sheets.

6. The invention of claim 5, wherein each sheet has one gate wire attached to each edge of the sheet.

7. The invention of claim 6, wherein spacer means is mounted on said length of pipe to keep the adjacent upper ends of said sheets of vinyl material spaced from one another.

8. The invention of claim 7, wherein said spacer means is a series of short lengths of non conductive pipe mounted telescopically on said rigid pipe.

* * * * *